United States Patent [19]
McGarry et al.

[11] Patent Number: 5,861,910
[45] Date of Patent: Jan. 19, 1999

[54] IMAGE FORMATION APPARATUS FOR VIEWING INDICIA ON A PLANAR SPECULAR SUBSTRATE

[76] Inventors: E. John McGarry, 14534 SW. Pinot, Portland, Oreg. 97224; Jeffrey Friedman, 3320 S. Shore Blvd., Lake Oswego, Oreg. 97034

[21] Appl. No.: 954,983

[22] Filed: Oct. 21, 1997

Related U.S. Application Data

[63] Continuation of Ser. No. 630,421, Apr. 2, 1996, abandoned.

[51] Int. Cl.⁶ .................................................. H04N 7/18
[52] U.S. Cl. .......................... 348/87; 348/131; 382/145
[58] Field of Search ............................... 348/87, 92, 126, 348/128, 131; 382/145; H04N 7/18

[56] References Cited

U.S. PATENT DOCUMENTS

| | | |
|---|---|---|
| 4,561,731 | 12/1985 | Kley ............................................ 349/1 |
| 5,231,536 | 7/1993 | Wilt ......................................... 250/237 |
| 5,386,481 | 1/1995 | Hine et al. . | |
| 5,469,294 | 11/1995 | Wilt ......................................... 359/436 |

*Primary Examiner*—Howard Britton
*Attorney, Agent, or Firm*—Russ Weinzimmer

[57] ABSTRACT

The image formation system of the invention provides a compact apparatus for viewing indicia on a planar mirror-like (specular) substrate, such as a semiconductor wafer. The invention is particularly effective in viewing indicia that require either brightfield or high-angle darkfield illumination. These and other benefits of the invention are provided in part by providing selective directional focusing and defocusing of the reflected image of the illumination elements that illuminate the indicia, while providing substantial focusing of the image of the indicia at high contrast. In the case of high-angle darkfield illumination, directionally selective focusing maximizes useful darkfield area by minimizing interference between the reflected image of the illumination sources and the image of the indicia, while the contrast of the image of the indicia is maximized.

38 Claims, 18 Drawing Sheets

IMAGE FORMATION APPARATUS FOR VIEWING INDICIA ON A PLANAR SPECULAR SUBSTRATE

This is a continuation of application Ser. No. 08/630,421 filed on Apr. 2, 1996, now abandoned.

FIELD OF THE INVENTION

This invention relates generally to machine vision, and particularly to automated optical detection of indicia, such as alphanumeric characters and fiducial marks, on a mirror-like substrate, such as a semiconductor wafer.

BACKGROUND OF THE INVENTION

Silicon wafers are commonly marked with serial numbers, bar codes, or other indicia for identifying and tracking wafers throughout the process steps of semiconductor device fabrication. Typically, the indicia are created by forming small surface disruptions in an otherwise uniformly flat and reflective (mirror-like or specular) surface of the wafer. These surface disruptions can be formed using a high intensity laser light, or a diamond scribe, for example, to selectively remove or redistribute the material that forms the reflective surface of the wafer, thereby producing small pits in the surface having, for example, a cup-shaped cross-section.

To access the identification and tracking information represented by the indicia, a machine vision system can be used to acquire and analyze an image of the indicia. Image acquisition includes the step of image formation, i.e., forming an image of the indicia on, for example, an image sensor, such as a CCD array in a CCD camera. The CCD array then provides a signal representing the indicia that is digitally processed to determine the information represented by the indicia.

In practice, the step of forming an image of the indicia can be complicated by the presence of irregularities on the wafer surface, or by changes in surface characteristics resulting from the various deposition steps involved in the semiconductor manufacturing process. In fact, known image formation schemes do not provide adequate performance in certain important situations wherein the indicia have been degraded by process steps, resulting in indicia reading errors. Moreover, existing imaging systems are experiencing further difficulties detecting the newer "soft marks". To form a readable image of indicia on the surface of a semiconductor wafer throughout a series of semiconductor process steps, the readability of the output image produced by the image formation system must be unaffected by the consequent changes in the appearance of the indicia.

Known systems for detecting indicia formed in the surface of a semiconductor wafer include a light source for illuminating the surface of the wafer, and a camera that has a lens system with an adjustable circular aperture stop for forming images on an imaging device, such as a CCD array. In such systems, some fraction of the light rays transmitted towards the portion of the wafer surface bearing the indicia are reflected by the wafer surface, and are then received by the camera to form an image of the indicia.

To adapt to the changes in the appearance of the indicia due to the sequence of processing steps, it is known to condition, modulate, shape or otherwise control the transmitted light, i.e., the light rays transmitted towards the portion of the wafer surface bearing the indicia.

For example, it is known to selectively block a portion of the transmitted light, i.e., the set of all light rays emitted by the light source, before the transmitted light impinges upon the wafer surface. In particular, Wilt et al., U. S. Pat. Nos. 5,231,536, and 5,469,294 teach an illumination system for recognition of indicia on a reflective substrate having a plurality of light sources, and a plurality of opaque masks and/or baffles that stop selected light rays emitted by the light sources from reaching the reflective substrate.

Other methods of controlling transmitted light before it reaches the surface of a mirror-like substrate include collimating the light, such that only light rays characterized by substantially similar angle of incidence impinge upon the surface of the substrate. Light can be substantially collimated by placing the light source at a great distance from the surface of the substrate, or by use of light collimating optics. Also, controlling the angle of incidence of the transmitted light in other ways can be employed.

However, these and other known systems for imaging indicia on a mirror-like substrate tend to be large, expensive to manufacture, and difficult to integrate into existing equipment, such as wafer probers, and other semiconductor device manufacturing equipment. They also tend to be too heavy to mount on existing robot arm assemblies.

SUMMARY OF THE INVENTION

The image formation system of the invention provides a compact apparatus for viewing indicia on a planar mirror-like (specular) substrate, such as a semiconductor wafer. The invention is particularly effective in viewing indicia that require either brightfield illumination or high-angle darkfield illumination.

These and other benefits of the invention are provided in part by providing selective directional focusing and defocusing of the reflected image of the illumination elements that illuminate the indicia, while providing substantial focusing of the image of the indicia at high contrast. The reflected image of the illumination elements are defocused in a selected direction, while remaining focused in a direction that is perpendicular to the selected direction. In the case of high-angle darkfield illumination, such directionally selective focusing maximizes useful darkfield area by minimizing interference between the reflected image of the illumination sources and the image of the indicia, while also maximizing the contrast of the image of the indicia, thereby avoiding a prior art tradeoff between useful darkfield area and indicia image contrast.

Directionally selective focusing is achieved by selecting a plurality of ray bundles from the surface of the substrate, the ray bundles each having an elongated cross section, using an elongated slot aperture, or elongated mirror, for example. At the selector, each ray bundle has the same cross section, which cross section is the cross section of the selector. In the case of an elongated aperture, the cross section is the size and shape of the elongated aperture.

The image formation system of the invention forms a well-focused image of indicia on the surface of a mirror-like planar substrate, while also forming a directionally focused image of one or more illumination elements that illuminate the indicia. The illumination elements can be localized, such as a plurality of light emitting diodes, or can be longitudinally extended, such as a longitudinally extended fluorescent tube. The directionally focused image is defocused along a longitudinal direction and well-focused along a transverse direction. The longitudinal direction is defined by the longitudinal axis of an elongated selector/converger, e.g., an aperture/lens that selects a portion of the reflected light rays, the portion having an elongated cross-section, and converges the selected portion of the reflected light rays upon an image sensor to form an image of the indicia on the image sensor. The image sensor can be electronic, such as a CCD array, can be chemical, such as photographic film, or can be biological, such as a human eye.

In a preferred embodiment of the invention, the selector/converger includes an elongated slot aperture that is cooperative with a lens system that can also include a standard circular aperture of adjustable diameter.

In a preferred embodiment, the elongated slot aperture is formed as a slot in a printed circuit board that also supports a plurality of illumination elements. This printed circuit board is disposed in front of the lens of a video camera such that the only light rays that can enter the lens of the video camera are light rays that traverse the elongated slot aperture.

The printed circuit board includes two sets of lights: a first set adapted to provide darkfield illumination of the indicia, and a second set adapted to provide brightfield illumination. In a preferred embodiment, the second set includes a diffuser disposed in front of a plurality of light emitting elements such that light rays are emitted over a distributed region rather than from a plurality of localized points. In a further preferred embodiment, the first set of illumination elements includes two linear arrays of light emitting elements positioned on either side of the second set.

In darkfield mode, light emitted from the first set is reflected from the mirror-like surface of the wafer that includes the indicia, and is then selected using a slot aperture so as to allow only a selected set of the light rays that have been reflected in a diffuse or non-planar specular manner by the indicia to be received by the video camera. Substantially all of the rays that have been reflected in a planar specular manner do not reach the image detector of the video camera. Thus, in darkfield mode, the indicia appear bright against a dark background.

In bright field mode, diffuse or non-planar reflection from the indicia, or absorption by the indicia, result in light rays that do not reach the camera. Substantially all of the rays that have been specularly reflected reach the image detector of the video camera. Therefore, laser scribed marks appear dark on a bright background.

It is known that the diameter of a circular lens aperture is inversely related to the depth of field of an optical system that includes the circular lens aperture. The apparatus of the invention includes an elongated non-circular aperture that provides a directionally asymmetric depth of field. The invention uses the elongated aperture to provide a light ray acceptance angle that is greater along a direction parallel to the longitudinal axis of a string of indicia than the light ray acceptance angle along a direction that is perpendicular to the longitudinal axis of the string of indicia.

At the image sensor, the illumination elements appear as a virtual image created by reflection of the illumination elements off the wafer surface. This virtual image is located at a position that is twice the actual distance of the illumination elements from the wafer surface. The optical effect of the slot aperture is to "blur" the image of the individual light elements along a direction parallel to the longitudinal axis of the string of indicia, while maintaining relatively sharp focus along a direction transverse to the longitudinal axis. Directionally selective focusing of received light avoids the need to tightly control transmitted light for the purpose of imaging shallow scribes or so called "soft marks". This beneficially results in a substantial size, weight, and cost savings over known implementations of image formation systems for wafer identification.

An unexpected benefit of the use of an elongated slot aperture is an improvement in brightfield illumination. Specifically, due to the longitudinal defocusing of the image of the illumination element diffuser, the image of that diffuser is made more uniform in brightness. This results in more uniform contrast along all portions of the indicia, resulting in an enhanced image signal-to-noise ratio.

Also unexpectedly, further improvements in image signal-to-noise ratio are obtained by improved rejection of ambient light by the slot aperture as compared with a circular aperture having a diameter substantially equal to the length of the slot.

As recognized by the invention, controlling received light provides a less costly and more compact system for controlling the angle of the light rays that are integrated to form a useful output image than controlling transmitted light.

The invention allows simultaneous viewing of features on the planar reflective surface of the substrate, while limiting interference by virtual images of the illumination elements.

BRIEF DESCRIPTION OF THE DRAWINGS

The invention will be more fully understood from the following detailed description, in conjunction with the accompanying figures, wherein.

DETAILED DESCRIPTION OF THE PREFERRED EMBODIMENTS

Figure 1A:
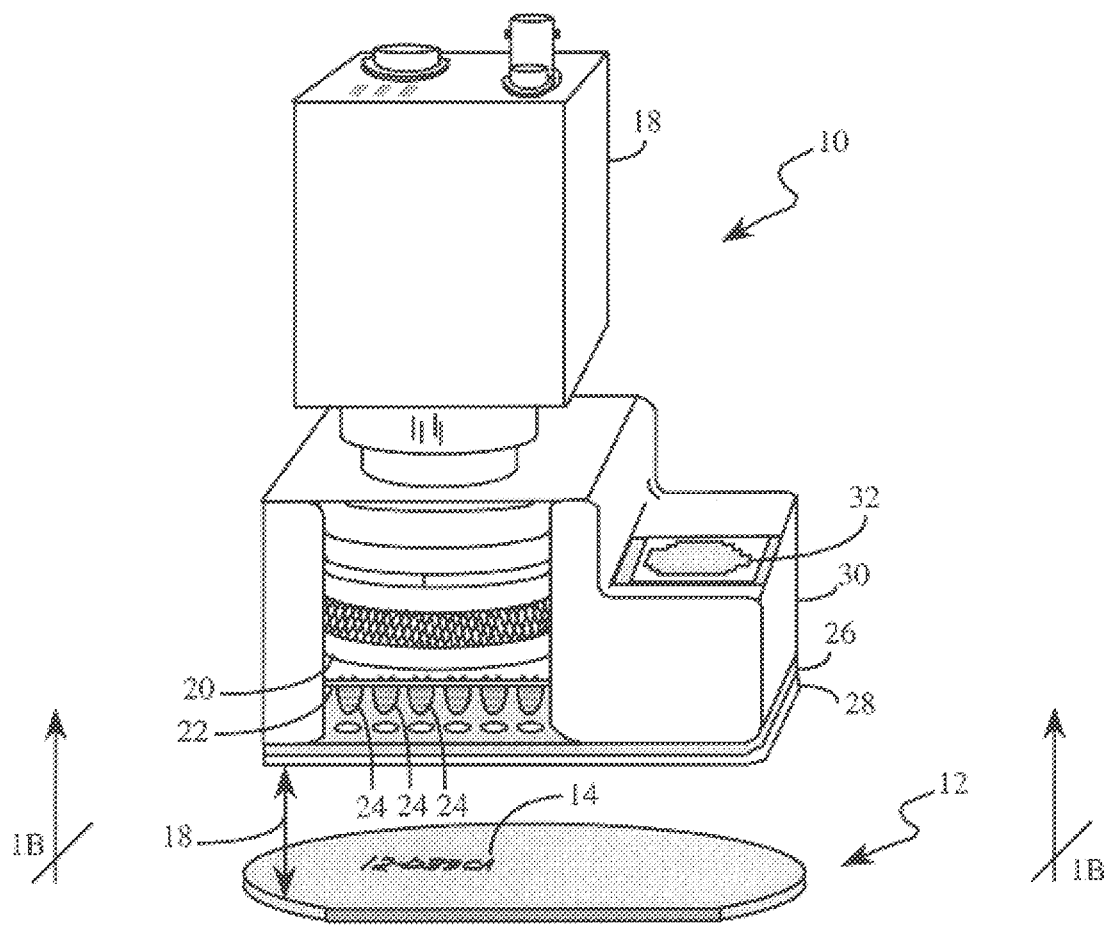
FIG. 1A is a perspective view of a preferred embodiment of the invention in a direct viewing position with respect to a planar reflective substrate.
Figure 1B:
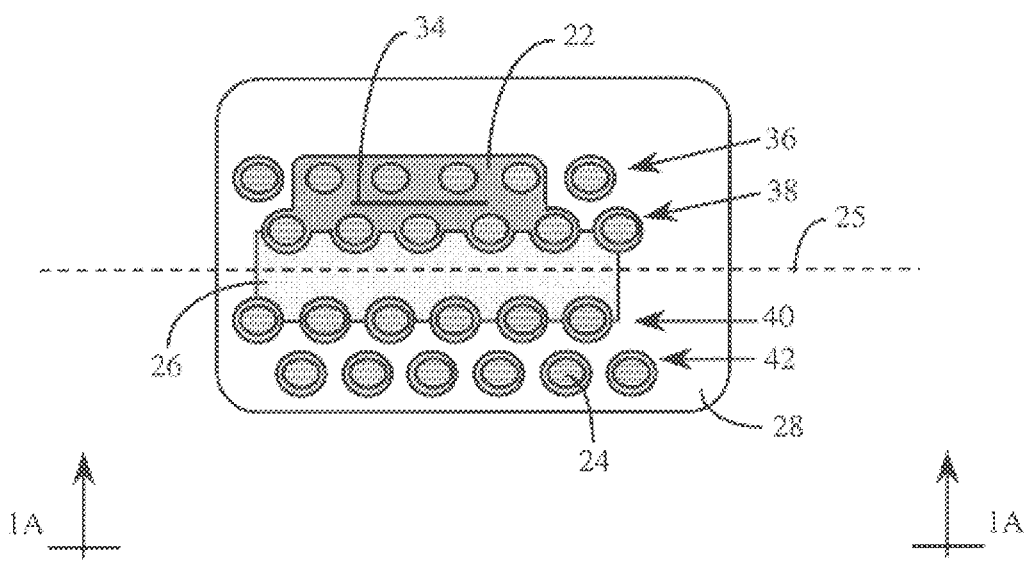
FIG. 1B is a view of the embodiment of FIG. 1A as seen from the planar reflective surface showing a plurality of lighting elements, a diffuser region, and an elongated slot aperture.
Figure 1C:
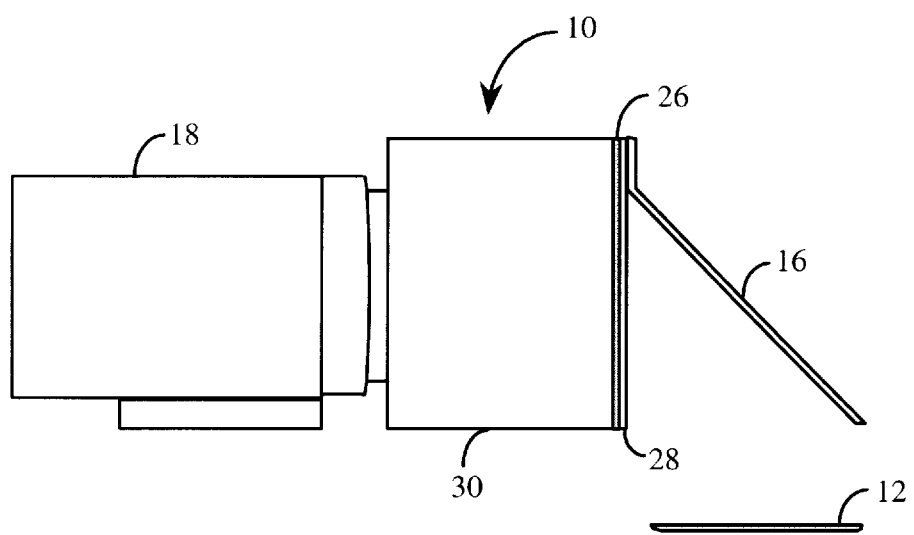
FIG. 1C is a side view of a preferred embodiment of the invention in an indirect viewing position with respect to a planar reflective substrate, and a cooperative mirror assembly.

Referring to FIGS. 1A and 1C, an embodiment of the image formation apparatus of the invention 10 is shown in various operating positions with respect to a mirror-like substrate 12, such as a semiconductor wafer or magnetic recording media, the substrate 12 having indicia 14 on its reflective surface. In FIG. 1A, the image formation apparatus 10 is in a direct illumination and viewing position.

FIG. 1C shows the image formation apparatus 10 in an indirect viewing and illuminating position, wherein the optical paths for viewing and illumination are folded by a mirror assembly 16. Those skilled in the art will appreciate that many other indirect viewing and illuminating positions are made possible by other mirror arrangements. The indirect viewing and illuminating positions, such as shown in FIG. 1C, are important for use in conjunction with some of the current installed base of semiconductor device fabrication equipment that provide only limited space for illuminating and viewing apparatus.

Figure 2:
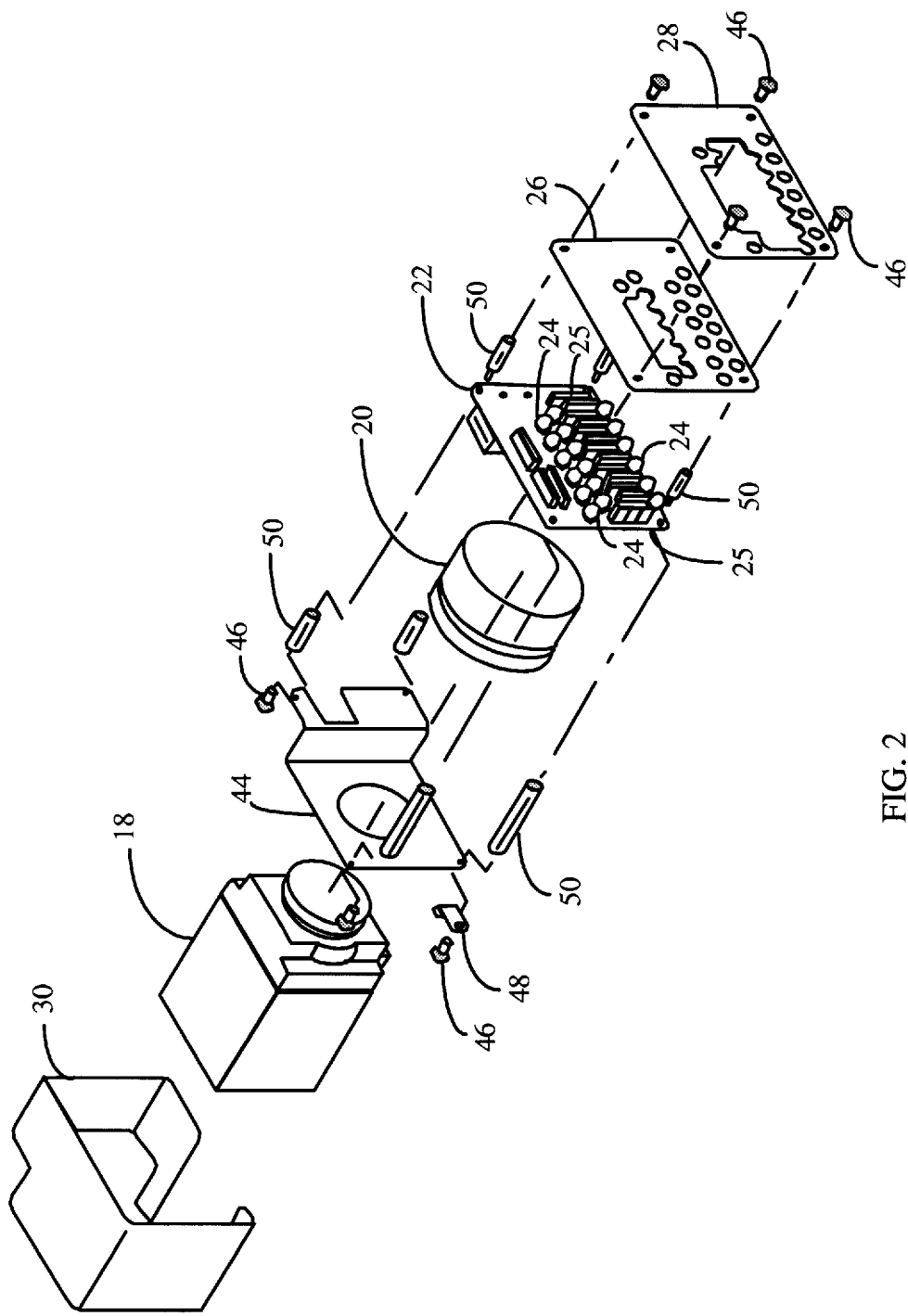
FIG. 2 is an exploded perspective view of the components of the embodiment of FIG. 1A.

As can be seen in FIGS. 1A and 2, the image formation apparatus of the invention includes, in a preferred embodiment, a standard video camera 18, and a lens 20 such as a Pulnix TM-7EX camera with a D.O. Industries Navitron TV lens, being 25 mm and F 1.4. This preferred embodiment also includes a printed circuit board 22, having a plurality of illumination elements 24 and 25, such as a plurality of round and rectangular light emitting diodes (LEDs).

Further, this embodiment includes a diffuser layer 26 for brightfield illumination having cut-out areas and diffuser areas. In masking relationship with the diffuser layer 26 is the opaque mask layer 28 that has cut-out areas that expose both the diffuser layer 26 and the illumination elements 24 directly. Rectangular LEDs 25 reside behind the unmasked portion of the diffuser layer 26.

Referring to FIG. 1B, the apparatus 10 of FIG. 1A is seen from the position of the reflective substrate 12, e.g., a semiconductor wafer. As discussed above, there is a plurality of illumination elements 24, e.g., an array of LEDs 24. Also, there is a diffuser region 26 for providing brightfield illumination, behind which is a plurality of rectangular LEDs 25 (not shown in this view).

Also, a slot aperture 34 is disposed between rows of LEDs. 24. The slot aperture 34 is formed, in this preferred embodiment, as a cut-out portion of the printed circuit board (PCB) 22. The slot aperture 34 provides the only paths from the surface of the reflective substrate to the lens 20 and ultimately to the image sensor (not shown) of the camera 18. Preferably, the slot aperture has a generally rectangular shape, having a longitudinal dimension and a transverse dimension, where the transverse dimension is determined empirically so as to obtain a useful darkfield region with the widest possible slot aperture, so as to provide the brightest image of the indicia, without interference (overlap) by the illumination sources. The longitudinal dimension can be anywhere within a range from extent of the free aperture of the lens system to about the extent of the transverse dimension.

The elongated aperture need not be rectangular; it can also be ellipsoidal, trapezoidal, race-track-like (having circular ends and straight longitudinal sides), or any other longitudinally extended shape.

In the preferred embodiment of FIG. 1B, the slot aperture is rectangular and has a length of 0.5 inches, and a width of about 0.035 inches.

The LEDs 24 are arranged in rows, each row being a different distance from the center line 25 of the brightfield illumination element 26, so as to provide either high angle darkfield illumination, or low angle darkfield illumination. In particular, rows 38 and 40 are for providing high angle darkfield illumination, and are about 0.3 inches from the center line 25 of the brightfield illumination element 26, for example. Thus, the closer a row of LEDs is to the center line 25 of the brightfield illumination element 26, the higher the angle of the darkfield illumination.

Also, rows 36 and 42 are for providing lower angle darkfield illumination. For example, rows 36 and 42 are each about 0.6 inches from the slot aperture 34.

In an alternate embodiment, only rows 38 and 40 are used to provide high angle darkfield illumination, and rows 42 and 36 are not included. Thus, an embodiment characterized by a transverse dimension smaller than the transverse dimension of the embodiment shown in FIG. 1A can be provided. A smaller transverse dimension can be useful in some applications where only limited space is available, such as some existing semiconductor manufacturing machinery, e.g., a wafer prober.

Referring again to FIGS. 1A and 2, an opaque baffle 30 surrounds most of the lens 20 and illumination elements 24. The opaque baffle 30 serves both to substantially inhibit light emitted by the illumination elements 24 from illuminating the substrate 12 via paths other than through the cut-out areas of the opaque mask layer 28, and to substantially inhibit ambient light from entering the lens 20 via any path that does not pass through the cut-out areas of the opaque mask layer 28.

The printed circuit board 22, and the illumination elements 24 and 25 thereon, are energized via a connector 32.

The working distance, i.e., the distance from the opaque mask layer 28 of this embodiment 10 of the image formation apparatus of the invention to the substrate 12, depends both on the type of lens used, and the desired field of view. For example, a 16 mm or 25 mm lens can be used at a working distance of about 3 to 4 inches. It is preferable to use a zoom lens that allows a constant working distance, while providing a variable image size of the indicia 14.

Referring again to FIG. 2, an exploded assembly diagram is shown that illustrates how the layers 26 and 28, the PCB 22, the lens 20 and the camera 18 are assembled. Specifically, screws 46, brackets 48, and posts 50 are used to space the various components such that the components are as close as possible, without touching. The distance of the slot aperture 34 in the PCB 22 from the lens 20 is not critical. In fact, the slot can advantageously be included within the lens system, before the lens system, or after the lens system. Specifically, a slot aperture can be included between the image sensor of the camera 18 and preferably close to the lens 20. Alternatively, an elongated slot aperture can be painted on the lens 20 using opaque paint, or other opaque coating.

Figure 3A:
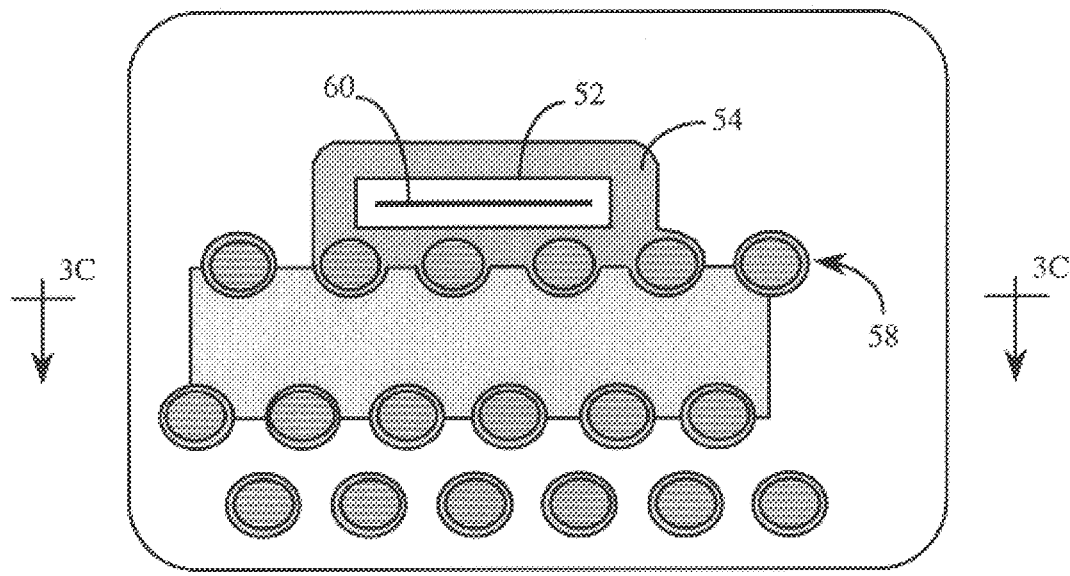
FIG. 3A is a view as seen from the planar reflective substrate of another preferred embodiment of the invention having a non-circular lens integrated with a printed circuit board, also showing a plurality of LEDs, an elongated slot aperture, and a diffuser region.
Figure 3B:
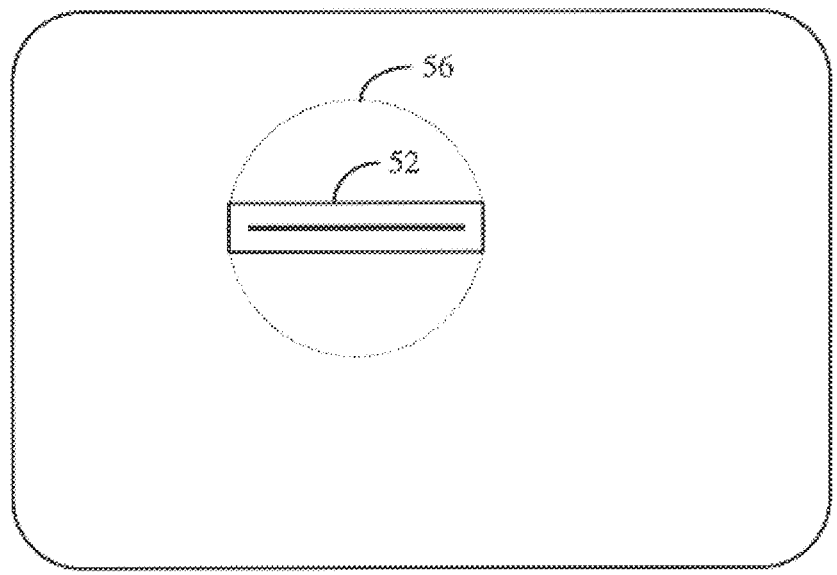
FIG. 3B is a view, as seen from the planar reflective surface, of the non-circular lens of FIG. 3A, also showing a phantom outline of a circular lens from which the non-circular lens of FIG. 3A can be derived.
Figure 3C:
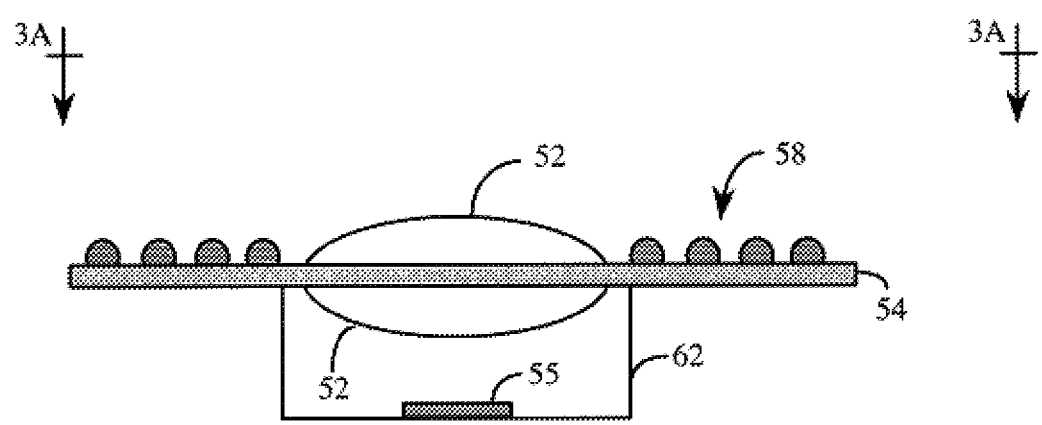
FIG. 3C is a side view of the embodiment of FIG. 3A, showing the LED, an image sensor, and an associated light shroud.

In another preferred embodiment, shown in FIGS. 3A, 3B, and 3C, a lens 52 is integrated with a printed circuit board (PCB) 54 to provide a highly compact embodiment of the invention. Since, according to the invention, only rays of light that pass through a slot aperture are permitted to reach an image sensor 55, only a portion of a lens 56 is included by removing non-functional portions of the lens 56, thereby providing the lens 52. Only the operative portions of the lens 56 are retained, thereby allowing a row of LEDs 58 to reside close to the slot aperture 60 so as to provide high angle darkfield illumination. The image sensor 55 is enclosed within an opaque cavity formed by an enclosure 62 so as to ensure that only light passing through the slot aperture 60 reaches the image sensor 55.

Referring again to FIG. 1A, the scribed indicia 14 on the reflective planar substrate 12 can be formed by laser ablation, for example, and can have various depths and cross-sections. Some indicia consist of a pattern of shallow pits, called "soft marks", each pit having a cross-section that results in non-planar specular reflection, and/or diffuse reflection, and/or absorption. Consequently, under brightfield illumination, such pits should appear darker than their surroundings, and under darkfield illumination, such pits should appear brighter than their surroundings. However, such pits (soft marks) are difficult to view because they tend to cause only minor deviations from planar specular surface behavior. In practice, it is found that softmarks are best viewed under "high angle" darkfield illumination, where "high angle" means at an angle close to 90 degrees from the plane of the substrate being viewed, i.e., between about 85 degrees and 90 degrees. In this way, the brightness of the image of the softmark indicia is maximized.

However, prior to the invention, high angle darkfield illumination was difficult to achieve in the case of an image formation apparatus for viewing highly reflective planar surfaces. This was due to the fact that the image of the illumination elements of the lighting system tends to interfere with the image of the soft mark indicia. This occurs because, at high angle darkfield illumination, the virtual image of the lights is very close to the image of the indicia. Also, since the softmark indicia do not appear bright compared with the light source, the round aperture stop of the camera must be opened as wide as possible to allow maximum illumination of the softmark indicia. However, when the round aperture is widely open, the depth of field of the lens system of the camera is reduced. Consequently, the image of the illumination elements can become defocused and extend over the image of the softmark indicia, thereby rendering them effectively undetectable.

As recognized by the invention, the solution to this multiple dilemma is elegantly provided by use of the elongated slot aperture 34 cooperative with the lens system 20 of the camera. To adjust the effective longitudinal extent of the elongated slot aperture, an adjustable round aperture, such as an iris diaphragm (not shown) can also be included. In the absence of an adjustable round aperture, the effective length of the elongated slot aperture 34 is determined by the diameter of the clear aperture of the lens system 20.

Figure 4:
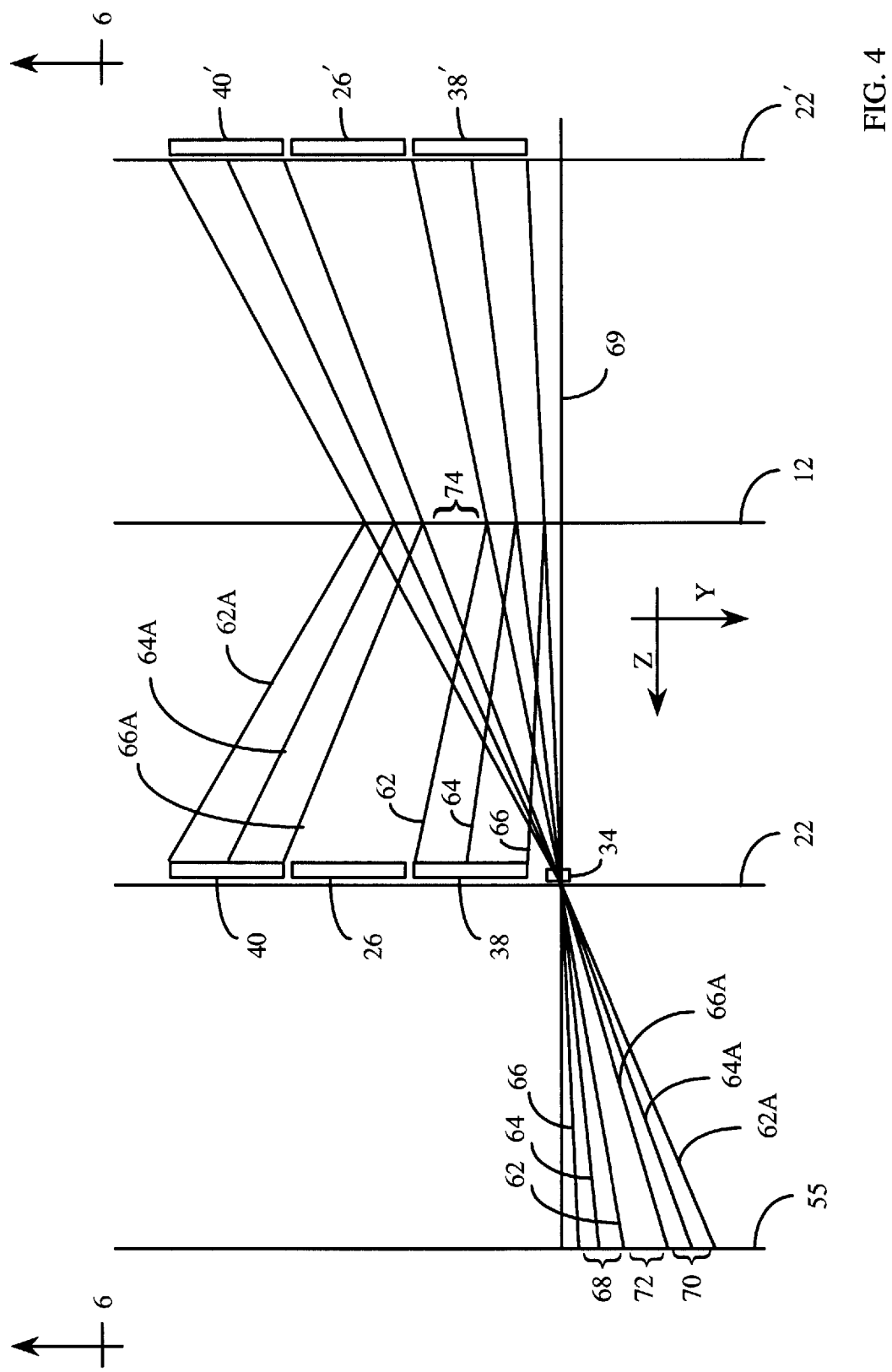
FIG. 4 is a ray diagram of a darkfield mode where only rays that traverse the elongated aperture of the invention, after being reflected from a planar reflective portion of the substrate are shown.

Referring to FIGS. 1B and 4, to achieve high angle darkfield illumination, a set of illumination elements 38 and/or 36 is disposed close (e.g., 0.3 inches) to the center line 25 of the brightfield illumination element 26.

In the case of the set of illumination elements 38 as shown in FIG. 4, each illumination element radiates multi-directionally. Light emitted from an illumination element can be usefully represented by a plurality of light rays, each light ray originating from the illumination element and extending in a particular direction. Thus, in the case of a point-source illumination element that radiates multi-directionally, a plurality of light rays emanate from the point-source, each light ray being characterized by a unique angle. Further, in the case of an illumination element having a surface area, such as a light emitting diode (LED), for each point on the surface, a plurality of light rays emanate, each light ray being characterized by a unique angle.

In the present invention, only a portion of the light rays emitted by each LED are reflected and ultimately traverse the elongated slot aperture 34 to reach the image sensor, thereby contributing to formation of an image at the image plane 55. In the case of planar specular reflection of the light rays emitted by the illumination element 38 that also traverse the elongated aperture 34, that portion is represented by three example light rays 62, 64, 66. Thus, a real image 68 of the illumination element 38 forms at the image plane 55. Likewise, a real image 70 of the illumination element 40 also forms at the image plane 55. Also note that due to the planar specular reflection at the surface of the substrate 12, there is a virtual image 38' of the illumination element 38 at the virtual image plane 22'.

In particular, of all of the light rays that are emitted by the illumination element 38, and that traverse the elongated slit 34 by way of a specular planar reflection at the substrate 12, the ray 62 represents the light ray having the lowest angle of incidence with respect to the planar substrate 12 (or with respect to an axis 69 that is perpendicular to the planar substrate 12 that also intersects a midpoint of the elongated aperture 34).

Analogously, the ray 66 represents the light ray having the highest angle of incidence, and the ray 64 represents the light ray having an intermediate angle of incidence, each such light ray also traversing the elongated slit 34 by way of a specular planar reflection at the substrate 12.

Similarly, the rays 62A, 64A, and 66A emitted by the illumination element 40 provide an alternate and/or additional source of high angle darkfield illumination than the ray bundle represented by the rays 62, 64, 66. Also, the rays 62A, 64A, and 66A contribute to forming a real image 70 of the illumination element 40 at the image plane 55.

In the darkfield mode of operation represented by FIG. 4, only illumination elements 38 and 40 are energized. As explained above, a real image 68 of the illumination element 38 forms at the image plane 55, and a real image 70 of the illumination element 40 forms at the image plane 55. If the surface of the substrate 12 is specular (mirror-like) and planar, then a substantially dark darkfield region 72 is formed at the image plane 55, the darkfield region 72 being bounded by the real images 68 and 70 of the illumination elements 38 and 40. The darkfield region 72 is substantially dark because there is no light ray that is emitted from a darkfield illumination element (38 or 40) that traverses the elongated slit by way of a specular planar reflection at the substrate plane 12, thereby reaching the darkfield region 72 of the image plane 55.

For purposes of diagrammatic clarity, FIG. 4 shows only those rays that traverse the elongated aperture 34, after being reflected in a specular planar manner. For example, rays that are reflected in a specular planar manner, but do not traverse the elongated aperture 34, do exist, but are not explicitly shown in FIG. 4, or in any of the other figures in this patent document. This is because such rays to not contribute to image formation at the image plane 55. There is a class of rays that are emitted by one of the darkfield illumination elements 38 or 40, however, that do contribute to image formation at the image plane 55, and do so within the region 72 of the image plane 55. Such rays impinge upon the region 74 of the substrate 12 having the indicia. Due to optical properties of the indicia that differ from the optical properties of the unmodified mirror-like substrate 12, some rays are reflected by the indicia so as to traverse the elongated aperture 34 and then form an image of the indicia 14 at the image plane 55 within the region 72. This image will be focused in both the longitudinal and transverse directions of the elongated aperture 34, because the indicia 14 reside on the substrate 12, which is disposed within both the longitudinal and transverse depths of field.

The optical properties of the indicia that differ from the optical properties of the unmodified mirror-like substrate 12 are optical properties that result in non-planar and/or non-specular reflection at the surface of the substrate 12 in the indicia window 74. By non-planar reflection, we mean reflection due to a region that is either not flat, e.g., curved, or is flat, but the flat region is not oriented in the same direction as the orientation of the major plane of the substrate 12.

Thus, light rays emitted by the darkfield illumination elements 38 and 40 are reflected by the indicia 14 in a way that is either not specular, e.g. diffusely reflected, or is specular but is not planar, so as to allow light rays emitted by the darkfield illumination elements 38 and 40 to impinge upon the darkfield region 72. Consequently, in the darkfield illumination mode, an indicia 14 located within an indicia window 74 will appear bright against the darkfield region 72 in an image formed at the image plane 55. For a discussion of specular and diffuse reflection, see page 67 of *Optics* by Eugene Hecht and Alfred Zajac, copyright 1974 by Addison-Wesley Publishing Co., Inc, the entire book being hereby incorporated by reference.

An example of specular, non-planar reflection is provided by the case of "soft marks" composed of a plurality of small pits, each pit having at least one non-planar specular region. In particular, if each pit is formed by creating a conical void in the surface of the substrate 12, such that the pit has a curved and specular inner surface, such pits would appear bright against a dark background. Alternatively, if each pit is formed by creating a tetrahedral void in the surface of the substrate, wherein one of the triangular planes of the tetrahedron is co-planar with respect to the major plane of the substrate 12, then the pit so-formed will have three flat triangular inner surfaces. Each of the three flat triangular inner surfaces will not be co-planar with respect to the major plane of the substrate 12, nor will any of the three flat triangular inner surfaces be oriented in the same direction as the direction of the major plane of the substrate 12. Consequently, an image of such a pit will appear bright against a dark background.

Figure 5:
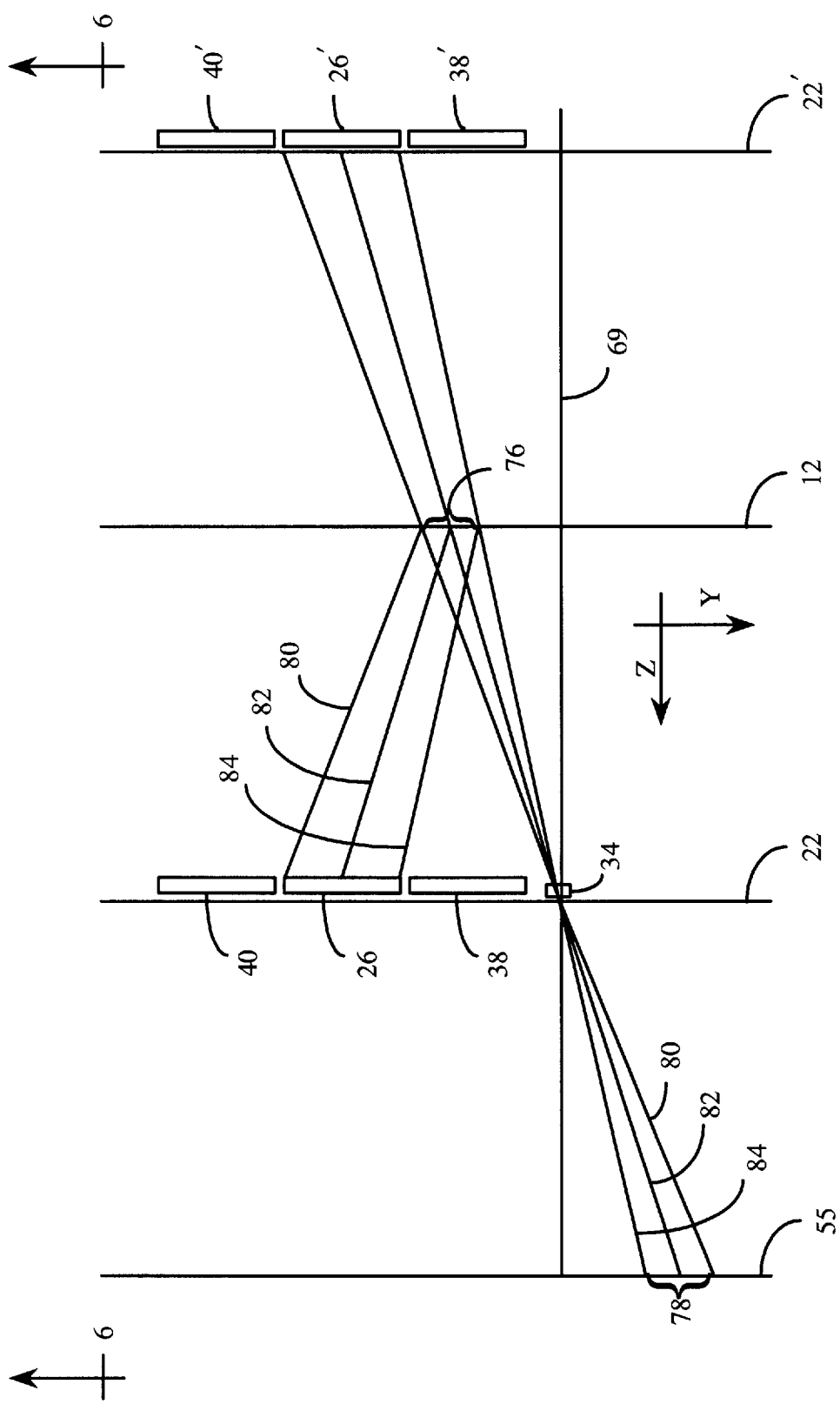
FIG. 5 is a ray diagram of a brightfield mode where only rays that traverse the elongated aperture of the invention, after being reflected from a planar reflective portion of the substrate are shown.

FIG. 5 illustrates a brightfield mode of operation of the invention. In the preferred embodiment of FIG. 5, to achieve brightfield illumination, a brightfield illumination element 26 is disposed between the two darkfield illumination elements 38 and 40.

In FIG. 5, each point on the illumination element 26 radiates multi-directionally. In the case of an illumination element having a surface area, such as a diffuser disposed in front of a plurality of light emitting diodes (LEDs), for each point on the surface, a plurality of light rays emanate, each light ray being characterized by a unique angle.

In the present invention, only a portion of the light rays emitted by the illumination element 26 are reflected by the substrate 12 and ultimately traverse the elongated slot aperture 34 to reach the image sensor, thereby contributing to formation of an image at the image plane 55. In the case of planar specular reflection of the light rays emitted by the illumination element 26 that also traverse the elongated aperture 34, that portion is represented by three example light rays 80, 82, and 84. Thus, a real image 78 of the illumination element 26 forms at the image plane 55. Also note that due to the planar specular reflection at the surface of the substrate 12, there is a virtual image 26' of the illumination element 26 at the virtual image plane 22'.

In particular, of all of the light rays that are emitted by the illumination element 26, and that traverse the elongated slit 34 by way of a specular planar reflection at the substrate 12, the ray 80 represents the light ray having the lowest angle of incidence with respect to the planar substrate 12 (or with respect to an axis 69 that is perpendicular to the planar substrate 12 that also intersects a midpoint of the elongated aperture 34).

Analogously, the ray 84 represents the light ray having the highest angle of incidence, and the ray 82 represents the light ray having an intermediate angle of incidence, each such light ray also traversing the elongated slit 34 by way of a specular planar reflection at the substrate 12.

In the brightfield mode of operation represented by FIG. 5, only the illumination element 26 is energized. A real image 78 of the illumination element 26 forms at the image plane 55. This real image 78 is out of focus along the longitudinal direction of the elongated aperture 34, i.e., in the X-direction of FIG. 5, and is in focus in the transverse direction of the elongated aperture 34, i.e., in the Y-direction of FIG. 5. If the surface of the substrate 12 is uniformly specular (mirror-like) and planar, and the brightfield illumination element 26 emits light substantially uniformly over its area, then a substantially uniformly bright brightfield region 78 is formed at the image plane 55. In fact, the elongated slot aperture enhances the uniformity of the brightfield region 78 due to the directional defocusing caused thereby. The brightfield region 78 is substantially uniformly bright because substantially all light rays that are emitted from the bright field illumination element 26, and that traverse the elongated slit, are reflected in a specular and planar manner at the substrate plane 12, and consequently reach the brightfield region 78 to form an image of the brightfield illumination element 26 at the image plane 55.

For purposes of diagrammatic clarity, FIG. 5 shows only those rays that traverse the elongated aperture 34, after being reflected in a specular planar manner by the substrate 12. For example, rays that are reflected in a specular planar manner, but do not traverse the elongated aperture 34, do exist, but are not explicitly shown in FIG. 5, or in any of the other figures in this patent document. This is because such rays to not contribute to image formation at the image plane 55.

There is a class of rays that are emitted by the brightfield illumination element 26, however, that do contribute to image formation at the image plane 55, and do so within the region 78 of the image plane 55. Such rays impinge upon the region 76 of the substrate 12 having the indicia 14. Due to optical properties of the indicia 14 that differ from the optical properties of the unmodified mirror-like substrate 12, some rays are reflected by the indicia 14 so as to not traverse the elongated aperture 34 and therefore not reach the image plane 55 along with the rest of the rays that form the image of the illumination source 26 within the region 78. In effect, a negative image of the indicia 14 is formed, where an absence or diminution of light intensity at a point on the image plane 55 indicates the presence of a portion of the indicia 14. This negative image of the indicia 14 will be focused in both the longitudinal and transverse directions of the elongated aperture 34, because the indicia 14 reside on the substrate 12, which is disposed within both the longitudinal and transverse depths of field.

The optical properties of the indicia 14 that differ from the optical properties of the unmodified mirror-like substrate 12 are optical properties that result in non-planar and/or non-specular reflection of light, or absorption of light at the surface of the substrate 12 in the region 76 that includes the indicia 14. By non-planar reflection, we mean reflection due to a region that is either not flat, e.g., curved, or is flat, but the flat region is not oriented in the same direction as the orientation of the major plane of the substrate 12.

Thus, light rays emitted by the brightfield illumination element 26 are reflected by the indicia 14 in a way that is either not specular, e.g. diffusely reflected, or is specular but is not planar, or is absorbed, so as to prevent light rays emitted by the brightfield illumination element 26 from impinging upon the brightfield region 78 of the image plane 55. Consequently, in the brightfield illumination mode, an indicia 14 located within an indicia window 76 will appear dark against the brightfield region 78 in an image formed at the image plane 55. For a discussion of specular and diffuse reflection, see page 67 of *Optics* by Eugene Hecht and Alfred Zajac, copyright 1974 by Addison-Wesley Publishing Co., Inc, the entire book being hereby incorporated by reference.

An example of light absorption is provided by the case of a plurality of dots on the substrate 12, each dot being formed by a quantity of substantially non-reflective black paint, pigment, or the like. Such dots would appear dark against a bright background.

Figure 6:
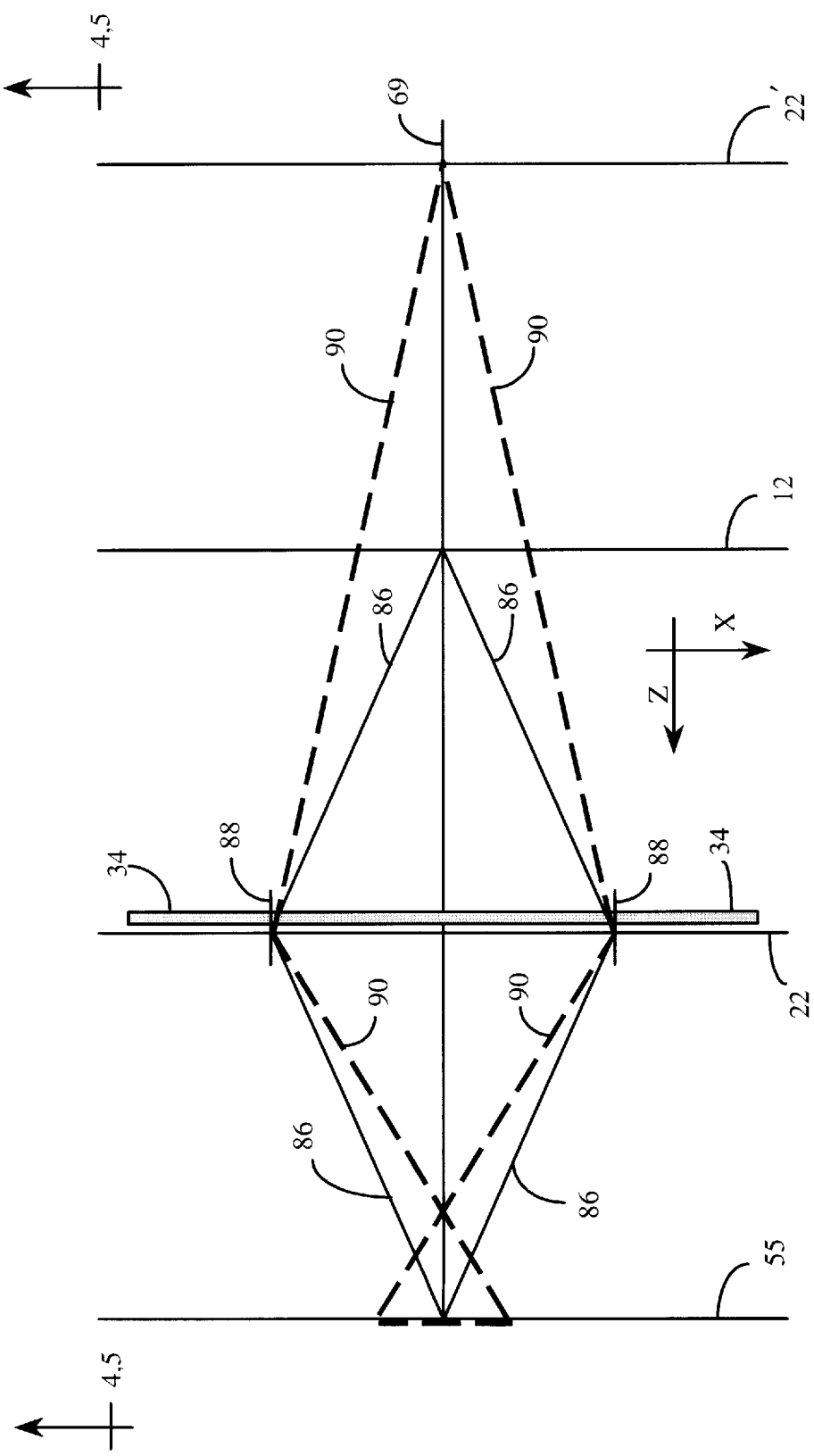
FIG. 6 is a marginal ray diagram showing marginal rays originating from real features of the reflective planar substrate, and virtual features of a virtual image of the illumination elements.

While FIGS. 4 and 5 show the behavior of selected light rays as shown looking along the longitudinal direction as defined by the elongated aperture 34, i.e., looking along the X-axis of FIGS. 4 and 5, FIG. 6 illustrates the behavior of other selected light rays as seen looking along a transverse direction with respect to the elongated aperture 34, i.e., looking along the Y-axis of FIGS. 4 and 5.

In particular, the solid sloping lines 86 represent focused marginal rays, so-called because the marginal rays 86 travel from a real object point (e.g., a portion of the indicia 14) on the axis 69 to the rim or margin of the clear aperture of the lens 88, which then converge towards the image plane 55.

By contrast, the broken sloping lines 90 represent directionally unfocused marginal rays, so-called because the marginal rays 90 travel from a virtual object point (e.g., a point of a virtual image of an illumination element) on the axis 69 to the rim or margin of the clear aperture of the lens 88, which then converge towards the image plane 55, but does not focus at the image plane 55 along the longitudinal or X-direction.

Thus, real objects, such as indicia on the substrate 12, are in focus along the X-direction at the image plane 55, while virtual objects, such as virtual images of the illumination source 26 at the virtual image plane 22', are out of focus along the X-direction.

Simultaneously, real objects, such as indicia on the substrate 12, are in focus along the Y-direction at the image plane 55, while virtual objects, such as virtual image of the illumination source 26 at the virtual image plane 22', are in focus along the Y-direction.

Thus, real objects, such as indicia on the substrate 12, are in focus along both the X- and Y-directions at the image plane 55, while virtual objects, such as virtual image of the illumination source 26 at the virtual image plane 22', are both in focus along the Y-direction, and out of focus along the X-direction. Accordingly, the image of the virtual objects at the virtual image plane, such as the virtual image of the illumination source 26 is termed "directionally focused". Directional focusing in the present invention is due to the optical action of the elongated aperture 34, or the like.

According to the invention, the optical action of the elongated aperture is to create directionally differential depths of field, i.e., the depth of field for focusing in the X-direction is different from the depth of field for focusing in the Y-direction. The depth of field of an optical system is the range of distances along the Z-direction from the optical system within which objects are substantially in focus. Commonly, the depth of field of an optical system is the same along all directions perpendicular to the optical axis of an optical system.

According to the invention, the substrate is located so as to reside within the depth of field in both the X- and Y-directions of the optical system that includes the lens 88 and the elongated aperture 34. Consequently, the substrate, and the indicia disposed upon it, are in focus at the image plane 55 in all directions. Also according to the invention, the virtual images of the illumination sources at the imaginary image plane 22' resides only within the depth of field in the Y-direction, and not within the depth of field in the X-direction. Consequently, the virtual images of the illumination sources are directionally out of focus along the X-direction at the image plane 55, as shown in FIG. 6.

Figure 7:
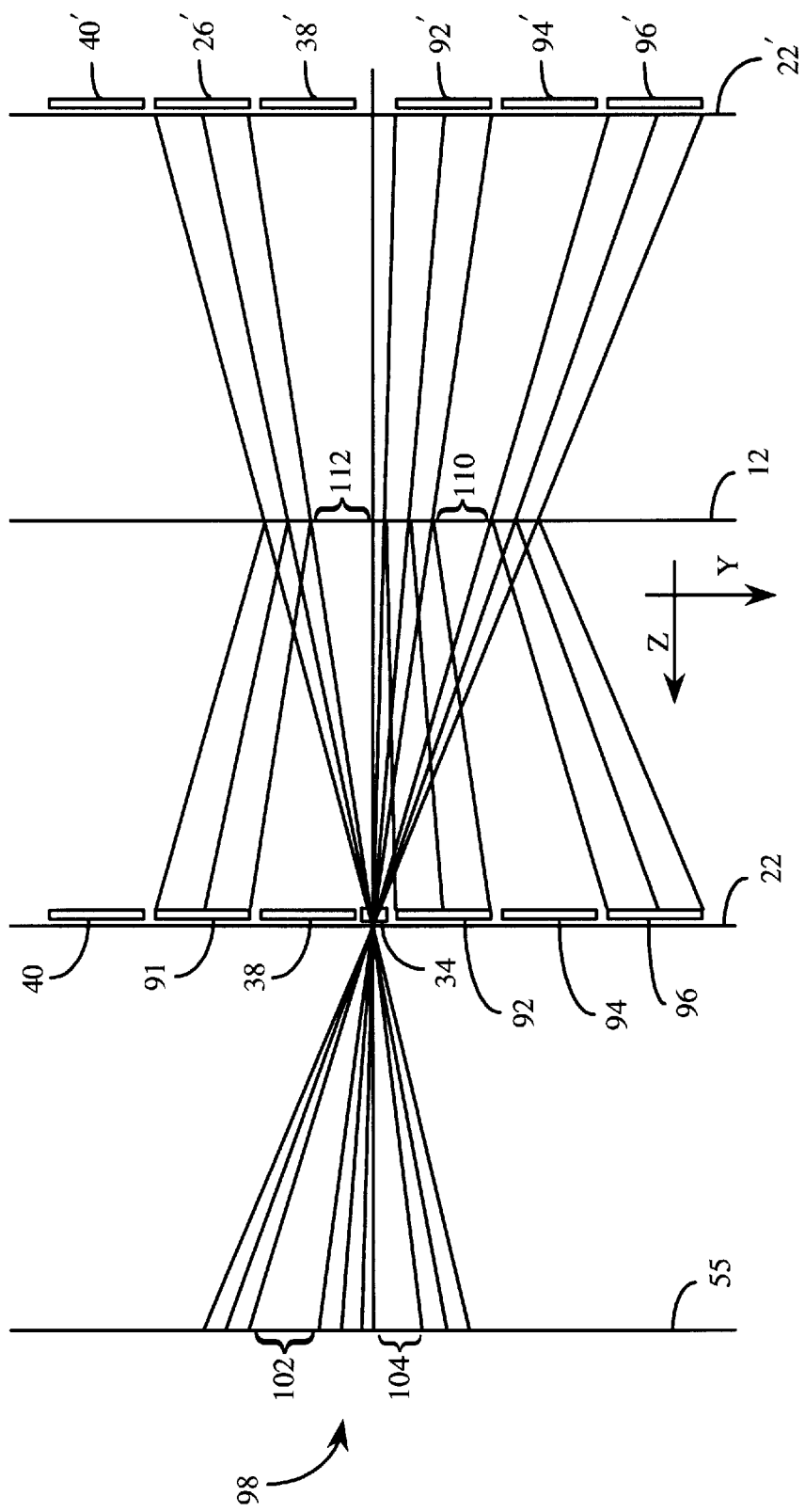
FIG. 7 is a ray diagram of a first mode of an extended darkfield embodiment of the invention.
Figure 8:
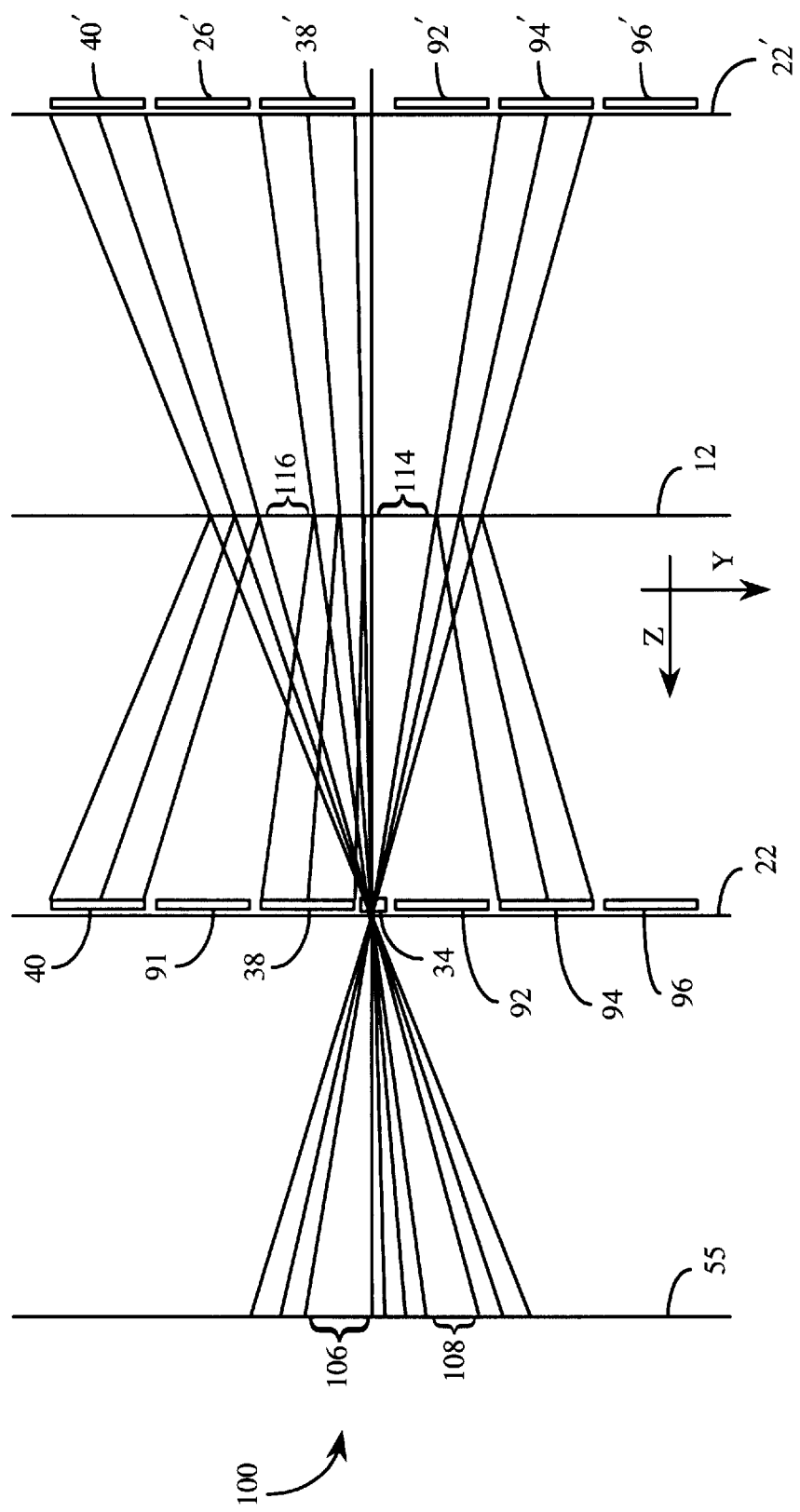
FIG. 8 is a ray diagram of a second mode of an extended darkfield embodiment of the invention.

FIGS. 7 and 8 show first and second operation modes, respectively, of an extended darkfield embodiment of the invention. In the first operation mode, a first set of illumination elements 91, 92, and 96 are energized, and in the second operation mode, a second set of illumination elements, in interleaved relationship with the first set, is energized. An extended darkfield image results from combining a first image 98 having a first plurality of darkfield regions 102, 104 formed at the image plane 55 in the first operation mode, with a second image 100 having a second plurality of darkfield regions 106, 108 formed at the image plane 55 in the second mode.

The darkfield regions 102 and 104 at the image plane 55 correspond to the regions 110 and 112, respectively, of the substrate 12. Similarly, the darkfield regions 106 and 108 at the image plane 55 correspond to the regions 114 and 116, respectively, of the substrate 12.

The combined regions 110, 114, 112, and 116 taken together are four times the width of a single darkfield region. Consequently, relatively large indicia, or indicia that are oriented transversely to a single darkfield region, can be imaged at the image plane 55 in this extended darkfield embodiment.

In a preferred embodiment, the images 98 and 100 are combined using a technique called "digital intensity minimization", wherein a per-pixel comparison of the first darkfield image 98 and the second darkfield image 100 is performed, the darker pixel of each per-pixel comparison being retained to be the corresponding pixel of the resulting extended darkfield image. Since almost every pixel of a darkfield region is darker than almost every pixel of a brightfield image, the resulting extended darkfield image is effectively the interleaved combination of the darkfield regions of each darkfield image 98 and 100.

Additional illumination elements have been added to the embodiment of FIG. 4 to provide the extended darkfield embodiment of FIGS. 7 and 8. Illumination elements can be added to either side of the elongated aperture 34. FIGS. 7 and 8 show an embodiment having three additional illuminations elements 92, 94, 96 symmetrically disposed about the elongated aperture 34. Further additional illumination elements can be added to provide an even larger extended darkfield region.

Another advantage of an extended darkfield region is that it allows the elongated aperture to be rotated with respect to an indicia so as to enhance the readability of the indicia by the image formation system of the invention. The elongated aperture is rotated together with all of the illumination elements. Rotation of the aperture together with a plurality of illumination elements can be achieved by physically rotating the entire image formation apparatus, or can be achieved without physically rotating the entire image formation apparatus using a multi-aperture embodiment described below in conjunction with FIGS. 11A and 11B.

Figure 11A:
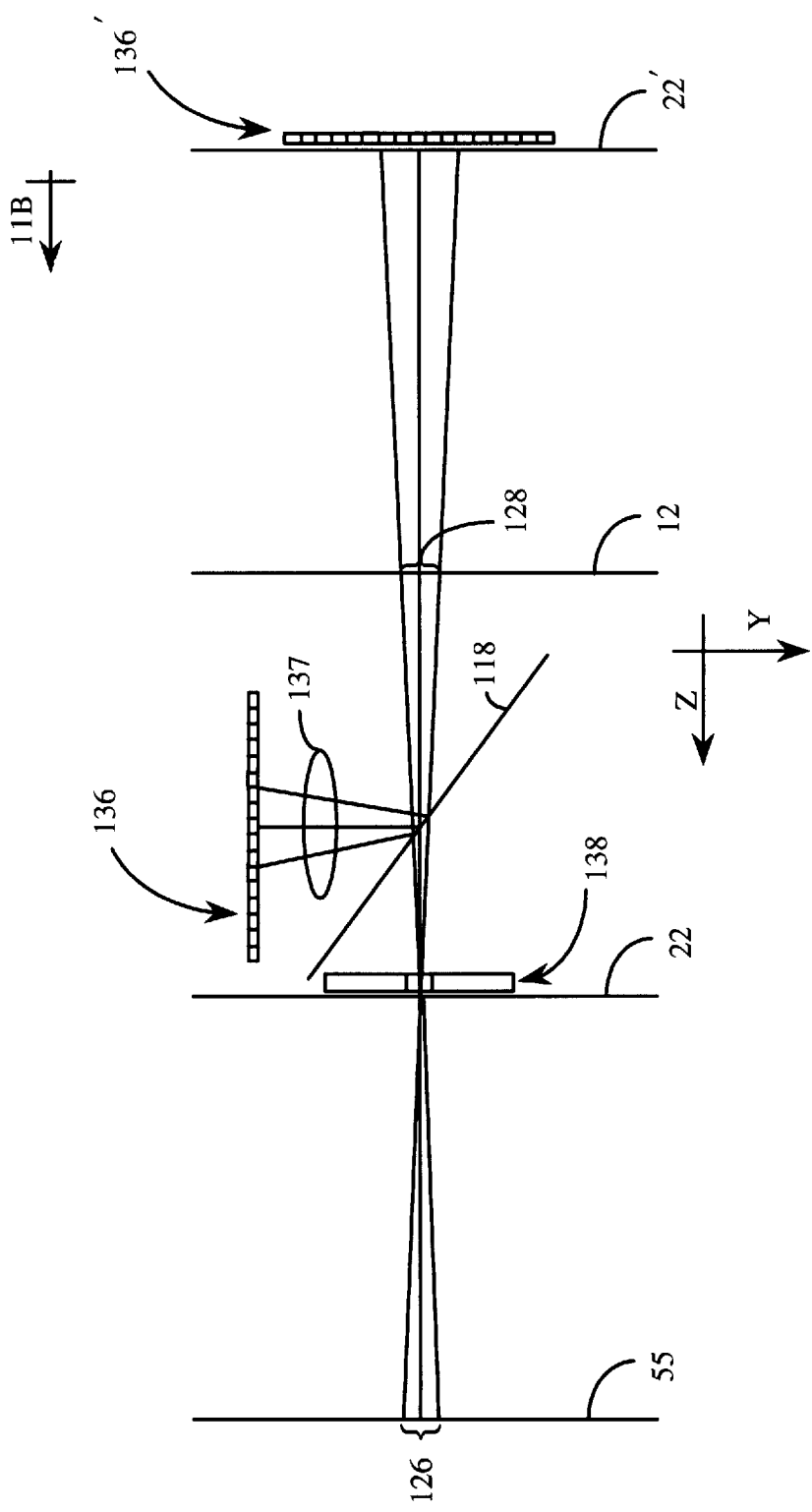
FIGS. 11A and 11B illustrate an embodiment of the invention having a plurality of possible elongated slot apertures.
Figure 11B:
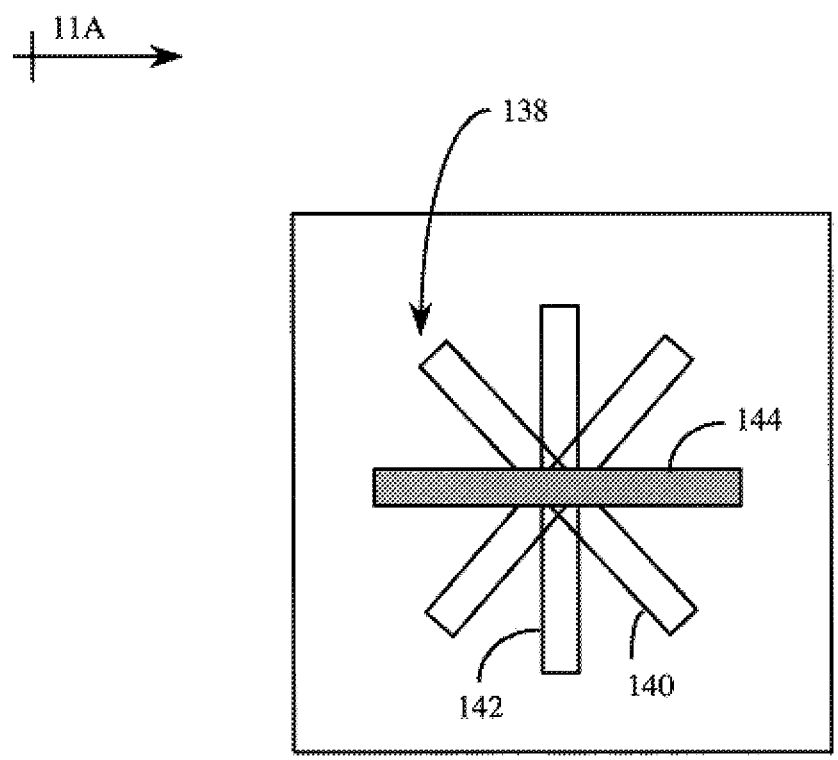

For example, FIG. 11A shows an independently addressable array of illumination elements 136, such as small LEDs or active matrix transistors, cooperative with an aperture selector 138 of FIG. 11B that can provide an elongated aperture of any selected shape, width, length, and angular orientation. The rays 137 are shown for an active portion of the array of illumination elements 136 to illuminate the section 128 of the substrate 12. For example, FIG. 11B shows three possible elongated slot apertures 140, 142, and 144 of rectangular shape, each with the same width and length, but at three different angular orientations. In principle, other angular orientations, shapes, widths and lengths are possible as well.

It is advantageous that only one possible elongated aperture be open to transmission of light at any one moment. For example, in FIG. 11B, only aperture 144 can transmit light. The aperture selector 138 can be implemented as an array of independently addressable liquid crystal shutter elements, that each can either block or transmit light.

An aperture selector 138 can also be implemented mechanically as an elongated opening in a rotatable disk.

Actual rotation of the elongated aperture with the illumination elements, or effective rotation of the elongated aperture with the illumination elements using the embodiment of FIGS. 11A and 11B, for example, provides a further advantage in that some indicia, or portions of some indicia, can become more detectable. For example, if an indicia consisted of groupings of diagonal v-shaped channels, such indicia may be more detectable if the elongated aperture and the illumination elements were rotated into alignment with the diagonal channels.

Figure 9:
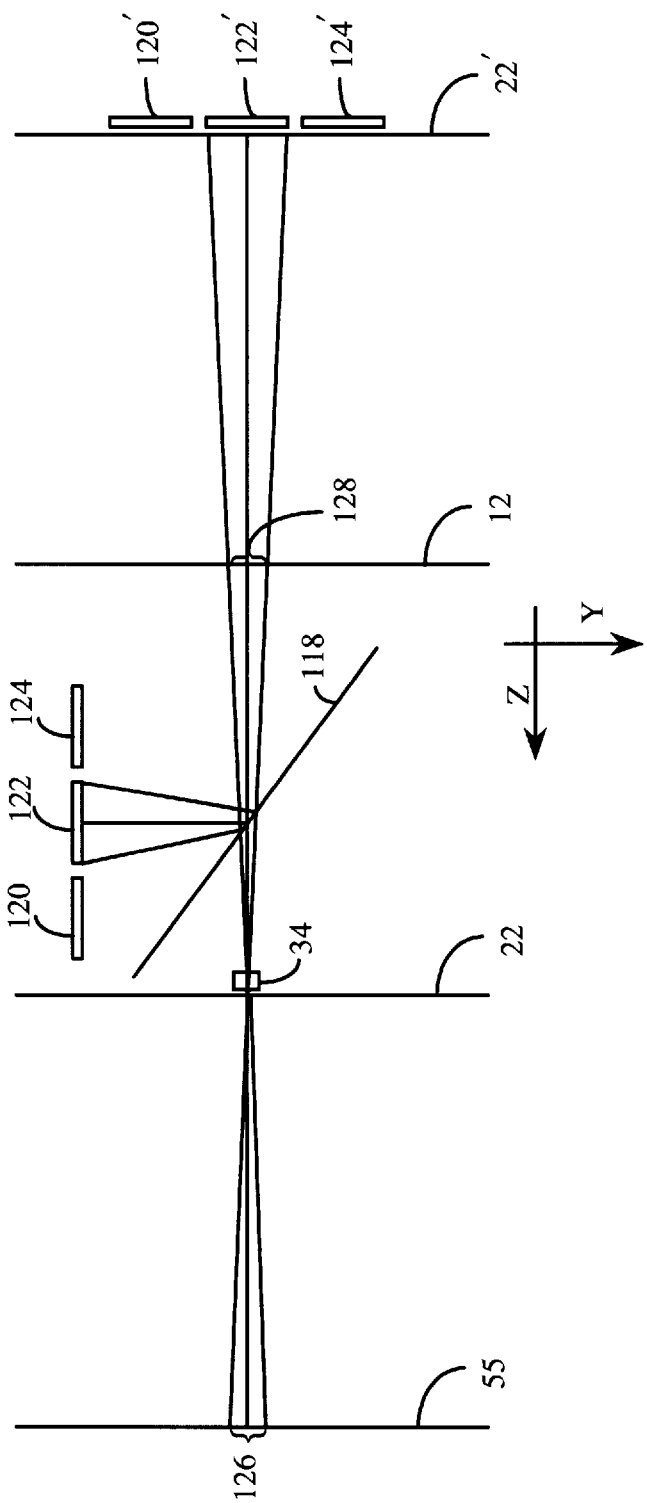
FIG. 9 is a ray diagram of a brightfield mode of an coaxial embodiment of the invention.
Figure 10:
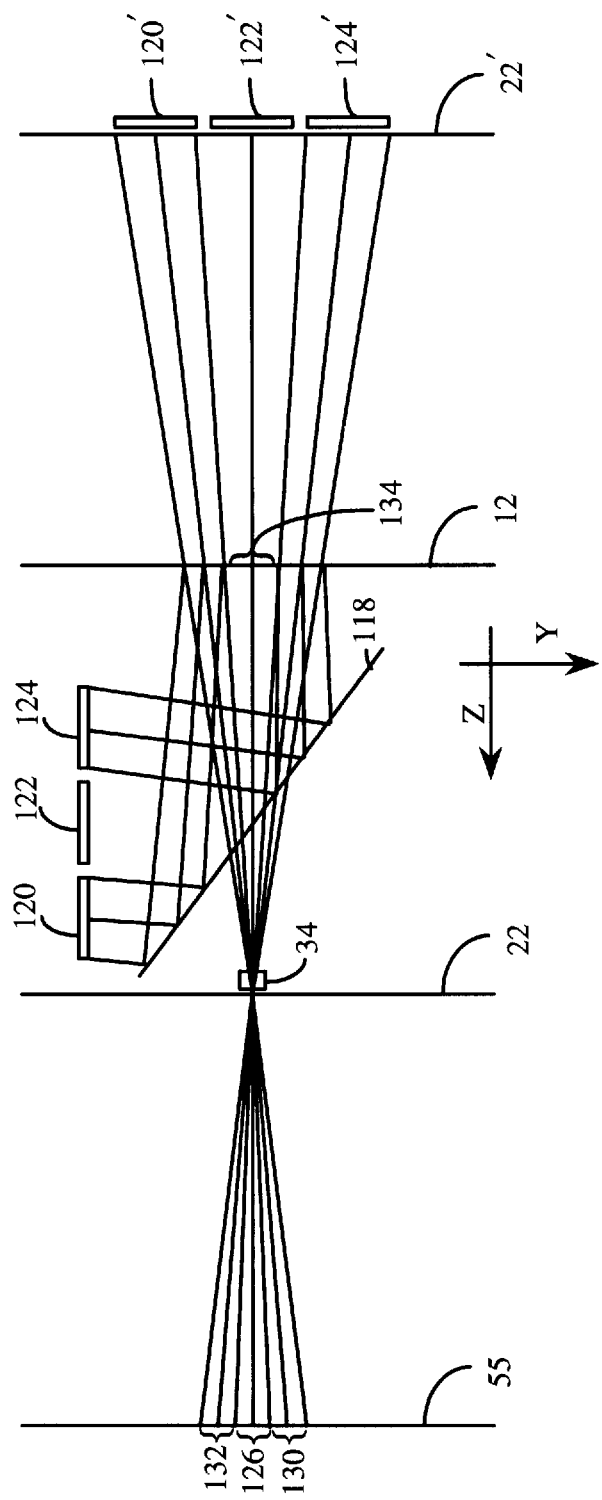
FIG. 10 is a ray diagram of a darkfield mode of an coaxial embodiment of the invention.

FIGS. 9 and 10 illustrate brightfield and darkfield modes of operation, respectively, of an on-axis embodiment of the invention. This embodiment employs a half-mirror 118, that provides one way to avoid problems associated with the illumination elements obstructing the main optical path through the aperture/lens system of the invention. In the brightfield mode of FIG. 9, a central illumination element 122 emits substantially unfocused light, which light is then reflected partially at a half-mirror 118. About half of the light impinges upon the substrate 12, which is then reflected from each point on the substrate that exhibits planar specular reflection back to the half-mirror 118. The half-mirror 118 transmits half of the light so-reflected towards the elongated slot aperture 34, which allows a portion of the light, based on the cross-sectional area of the aperture, to traverse the lens and ultimately form an image on the image plane 55.

The image is a brightfield image 126 of the indicia 14 located within the region 128 of the substrate 12.

In the darkfield mode of FIG. 10, darkfield illumination elements 120 and 124 emit substantially unfocused light, which light is then reflected partially at a half-mirror 118. About half of the light impinges upon the substrate 12, which is then reflected from each point on the substrate that exhibits planar specular reflection back to the half-mirror 118. The half-mirror 118 transmits half of the light so-reflected towards the elongated slot aperture 34, which allows a portion of the light, based on the cross-sectional area of the aperture, to traverse the lens and ultimately form an image of the indicia 14 and the darkfield illumination elements 120 and 124 on the image plane 55. The image is a darkfield image 126 of the indicia 14 located within the region 134 of the substrate 12. An image of the illumination elements 120 and 124 form in regions 130 and 132, respectively, on the image plane 55.

Figure 12:
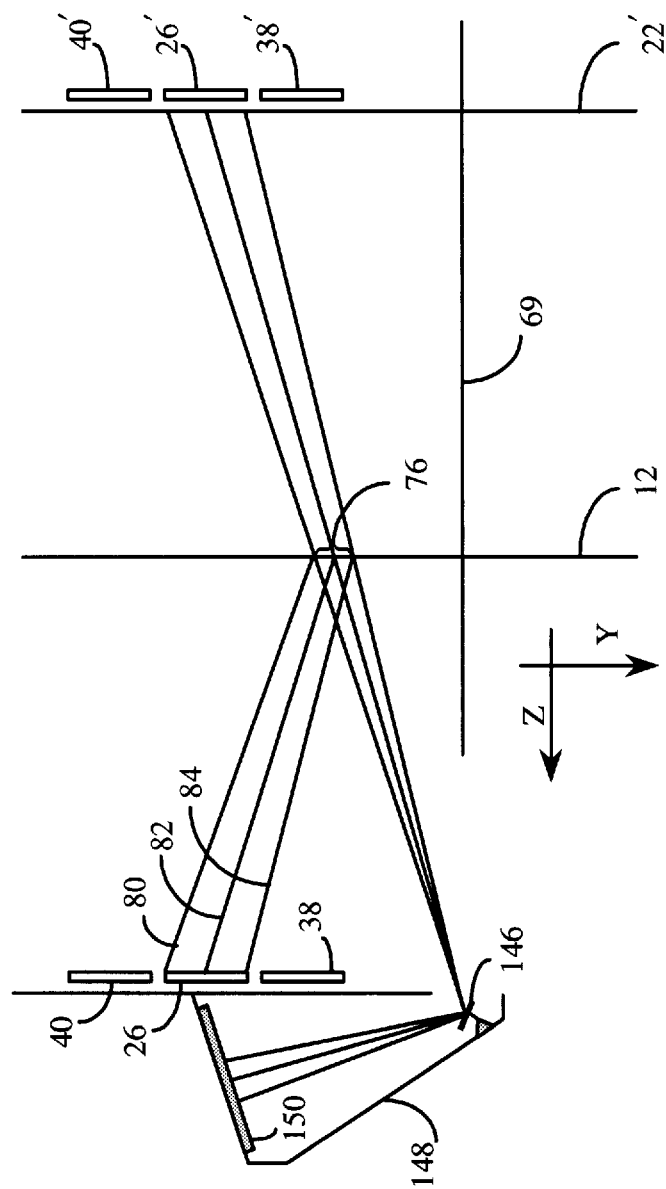
FIG. 12 is a ray diagram of a brightfield mode where only rays that are reflected by a slice of a focusing mirror of the invention, after being reflected from a planar reflective portion of the substrate are shown.

In another embodiment, shown in FIG. 12, the elongated aperture 34 and the lens (not shown) of FIG. 5 are replaced by a slice of a focusing mirror 146. An enclosure/support 148 supports both the mirror 146 and an image sensor 150. The enclosure/support 148 also shields the image sensor 150 from ambient light.

The slice of the focusing mirror 146 is obtained by taking a slice of an off-axis focusing reflector, having a shape determined by parabolic and higher order terms, the values of which are determined by the desired focal length, and the desired optical path folding angle, for example, which are each application-specific, as is understood by those skilled in the art of focusing mirror design.

Figure 13:
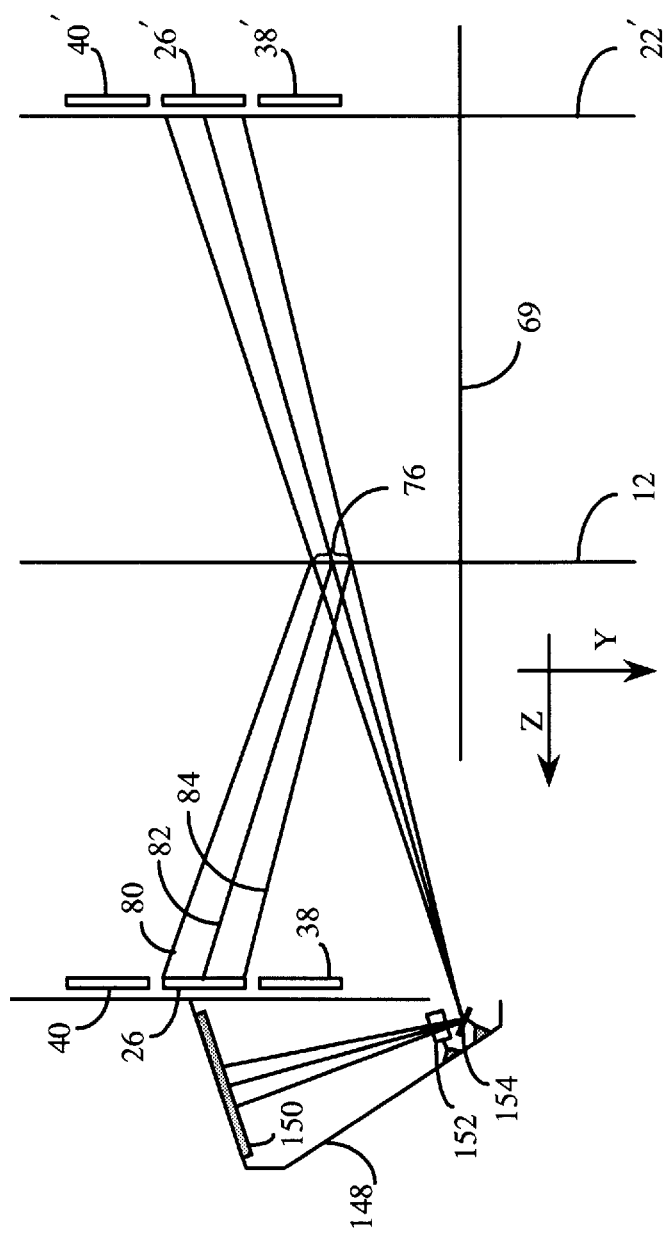
FIG. 13 is a ray diagram of a brightfield mode where only rays that are reflected by a slice of a planar mirror and focused by a slice of a lens, after being reflected from a planar reflective portion of the substrate are shown.

Referring to FIG. 13, the slice of the focusing mirror 146 of FIG. 12 is replaced by a slice of a focusing lens 152, and a slice of a mirror 154. In this embodiment, the slice of the mirror 154 serves to select a bundle of rays having an elongated cross section, and then those rays are converged upon the image sensor 150 to provide the same functionality as the embodiment of FIG. 5, for example.

Figure 14:
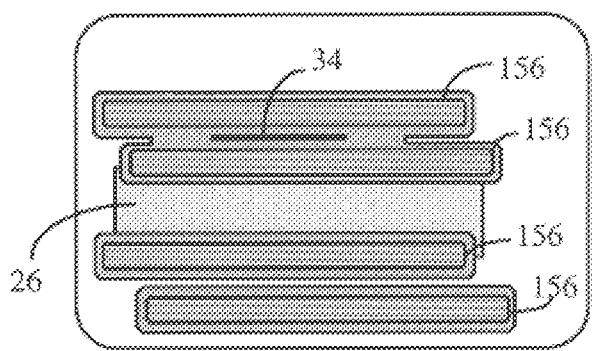
FIG. 14 is a view as seen from the planar reflective surface of a plurality of elongated lighting elements, a diffuser region, and an elongated slot aperture.

With reference to FIG. 14, the LED's 24 of FIG. 1B are replaced by elongated illumination elements 156, also showing the elongated aperture 34, and the diffuser 26. Elongated illumination elements can be implemented as fluorescent tubes, elongated plasma discharge tubes, long incandescent filaments, or lossy wave guides having an illumination source at one or both ends of each elongated element 156.

Other modifications and implementations will occur to those skilled in the art without departing from the spirit and the scope of the invention as claimed. Accordingly, the above description is not intended to limit the invention except as indicated in the following claims.

What is claimed is:

1. An apparatus for forming images of indicia disposed on a mirror-like substrate, the apparatus comprising:
   a plurality of illumination elements for providing incident light rays so as to illuminate the mirror-like substrate, thereby producing reflected light rays;
   an image sensor; and
   a selector/converger that selects a bundle of the reflected light rays having an elongated cross-section, and converges the bundle of the reflected light rays upon the image sensor so as to form an image of at least a portion of the indicia on the image sensor.

2. The apparatus of claim 1, wherein the selector/converger comprises:
  an elongated slot aperture having a longitudinal axis for selecting a bundle of the rays reflected by the mirror-like substrate to provide a selected ray bundle having an elongated cross section; and
  a lens, cooperative with the elongated slot aperture, for converging the selected ray bundle so as to provide a substantially focused image of the indicia on the image sensor, and to provide an image of the illumination elements on the image sensor that is both substantially defocused along the longitudinal axis, and substantially focused transverse to the longitudinal axis.

3. The apparatus of claim 1, wherein the selector/converger comprises:
  an elongated mirror having a longitudinal axis for selecting a portion of the rays reflected by the mirror-like substrate so as to provide a reflected selected ray bundle having an elongated cross section; and
  a lens, cooperative with the elongated mirror, that converges the selected ray bundle so as to provide a substantially focused image of the indicia on the imaging device, and to provide an image of the illumination elements on the imaging device that is both substantially defocused along the longitudinal axis and substantially focused transverse to the longitudinal axis.

4. The apparatus of claim 1, wherein the selector/converger comprises:
  an elongated curved mirror having a longitudinal axis for selecting and converging a portion of the rays reflected by the mirror-like substrate so as to provide a substantially focused image of the indicia on the imaging device, and so as to provide an image of the illumination elements on the imaging device that is both substantially defocused along the longitudinal axis, and substantially focused transverse to the longitudinal axis.

5. The apparatus of claim 1, wherein the plurality of illumination elements includes a subset of illumination elements that are disposed with respect to the selector/converger so as to provide dark-field illumination of the indicia.

6. The apparatus of claim 1, wherein the plurality of illumination elements includes a subset of illumination elements that are disposed with respect to the selector/converger so as to provide high-angle darkfield illumination of the indicia.

7. The apparatus of claim 1, wherein the plurality of illumination elements includes a subset of illumination elements that are disposed with respect to the selector/converger so as to provide bright-field illumination of the indicia.

8. The apparatus of claim 1, wherein the plurality of illumination elements is mounted on a printed circuit board, and the selector/converger includes an elongated slot in the printed circuit board, and a lens system, the elongated slot being disposed in front of the lens system so as to function as an aperture stop.

9. The apparatus of claim 1, wherein the plurality of illumination elements includes a diffuser disposed between a subset of the illumination elements and the mirror-like substrate so as to provide diffused and distributed light suitable for brightfield illumination of the indicia.

10. An apparatus for forming images of indicia disposed on a mirror-like substrate, the apparatus comprising:
  a plurality of illumination elements for providing incident light rays so as to illuminate the mirror-like substrate, thereby producing reflected light rays;
  an image sensor; and
  a lens/aperture system including an elongated aperture slot having a longitudinal axis, the lens/aperture system being characterized by a first depth of field for focusing upon the image sensor along a longitudinal direction, the first depth of field being substantially smaller than a second depth of field for focusing upon the image sensor along a transverse direction.

11. The apparatus of claim 10, wherein a virtual image of the plurality of illumination elements is not disposed within the first depth of-field and is disposed within the second depth of field.

12. The apparatus of claim 10, wherein the indicia on the mirror-like substrate is disposed both within the first depth of-field and within the second depth of field.

13. The apparatus of claim 10, wherein a virtual image of the plurality of illumination elements is not disposed within the first depth of-field and is disposed within the second depth of field, and wherein the indicia on the mirror-like substrate is disposed within both the first depth of-field and the second depth of field.

14. The apparatus of claim 10, wherein the plurality of illumination elements is disposed on a printed circuit board, and the printed circuit board includes an elongated aperture stop cooperative with a lens system of the lens/aperture system.

15. The apparatus of claim 10, wherein the plurality of illumination elements is disposed on a printed circuit board, the printed circuit board includes an elongated aperture stop cooperative with a lens system of the lens/aperture system, and the elongated aperture slot is disposed so as to provide the only paths through the lens system.

16. The apparatus of claim 14, wherein the printed circuit board is opaque.

17. The apparatus of claim 10, wherein the lens/aperture system includes a pair of baffles for defining an elongated aperture cooperative with a lens system of the lens/aperture system.

18. The apparatus of claim 10, wherein the plurality of illumination elements provides incident light rays via a half mirror so as to illuminate the mirror-like substrate.

19. The apparatus of claim 10, wherein the plurality of illumination elements includes a first plurality of darkfield illumination elements and a second plurality of darkfield illumination elements, and the apparatus further comprises:
  means for alternately energizing the first plurality of darkfield illumination elements and the second plurality of darkfield illumination elements;
  first memory means, cooperative with the image sensor, for storing a first darkfield image resulting from energizing the first plurality of illumination elements;
  second memory means, cooperative with the image sensor, for storing a second darkfield image resulting from energizing the second plurality of illumination elements;
  image combination means, cooperative with the first and second memory means, for combining the first darkfield image and the second darkfield image so as to provide an extended darkfield image.

20. The apparatus of claim 19, wherein the elongated aperture slot is rotatable.

21. The apparatus of claim 19, wherein the elongated slot aperture can assume a plurality of quantized angular orientations.

22. The apparatus of claim 19, wherein the elongated slot aperture is formed by a liquid crystal shutter.

23. The apparatus of claim 19, wherein the image combination means includes means for performing a per-pixel comparison of the first darkfield image and the second darkfield image, so as to provide an extended darkfield image, each pixel of the extended darkfield image being the darker pixel of a pixel of the first darkfield image and a corresponding pixel of the second darkfield image.

24. The apparatus of claim 10, further including a mirror, cooperative with the lens/aperture system, for folding the optical path traversed by both the incident light rays and the reflected light rays.

25. An image formation apparatus for acquiring images of indicia on a mirror-like substrate, the apparatus comprising:

a plurality of illumination elements for providing incident light rays so as to illuminate the mirror-like substrate, thereby producing reflected light rays;

a printed circuit board for supporting and energizing the plurality of illumination elements, the printed circuit board including an elongated slot aperture having a longitudinal axis for selecting a bundle of the rays reflected by the mirror-like substrate to provide a selected ray bundle having an elongated cross section;

an image sensor; and a lens, cooperative with the elongated slot aperture, for converging the selected ray bundle so as to provide a substantially focused image of the indicia on the image sensor, and to provide an image of the illumination elements on the image sensor that is both substantially defocused along the longitudinal axis, and substantially focused transverse to the longitudinal axis.

26. The apparatus of claim 25, wherein the plurality of illumination elements includes a subset of illumination elements that are disposed on the printed circuit board with respect to the elongated slot aperture so as to provide dark-field illumination of the indicia.

27. The apparatus of claim 25, wherein the plurality of illumination elements includes a subset of illumination elements that are disposed on the printed circuit board with respect to the elongated slot aperture so as to provide high-angle darkfield illumination of the indicia.

28. The apparatus of claim 25, wherein the plurality of illumination elements includes a subset of illumination elements that are disposed on the printed circuit board with respect to the elongated slot so as to provide brightfield illumination of the indicia.

29. The apparatus of claim 25, wherein the plurality of illumination elements includes a diffuser for diffusing the light provided by a subset of the illumination elements so as to provide brightfield illumination of the indicia.

30. The apparatus of claim 25, wherein the lens is characterized by an elongated clear aperture.

31. The apparatus of claim 25, wherein the lens is characterized by an elongated clear aperture, and the lens is mounted on the printed circuit board so as to be cooperative with the elongated slot aperture.

32. The apparatus of claim 25, wherein the elongated slot aperture is rotatable.

33. The apparatus of claim 25, wherein the elongated slot aperture can assume a plurality of quantized angular orientations.

34. The apparatus of claim 25, wherein the elongated slot aperture is formed by a liquid crystal shutter.

35. The apparatus of claim 25, further including:

at least one additional elongated slot aperture;

for each elongated slot aperture, a light blocker cooperative with the elongated slot aperture, for preventing light from traversing the elongated slot aperture.

36. The apparatus of claim 35, further including an all-but-one excluder, cooperative with each light blocker, for ensuring that light can traverse only one elongated slot aperture at a time.

37. An image formation apparatus for acquiring images of indicia on a mirror-like substrate, the apparatus comprising:

a longitudinally extended light source for providing incident light rays along the light source so as to illuminate a longitudinally extended portion of the mirror-like substrate, thereby producing reflected light rays;

an image sensor; and a selector/converger that selects a bundle of the reflected light rays having an elongated cross-section, and converges the bundle of the reflected light rays upon the image sensor so as to form an image of at least a portion of the indicia on the image sensor.

38. An apparatus for forming images of indicia disposed on a mirror-like substrate, the apparatus comprising:

a plurality of illumination elements for providing incident light rays so as to illuminate the mirror-like substrate, thereby producing reflected light rays, the plurality of illumination elements including a first plurality of darkfield illumination elements and a second plurality of darkfield illumination elements;

an image sensor;

a selector/converger that selects a bundle of the reflected light rays having an elongated cross-section, and converges the bundle of the reflected light rays upon the image sensor so as to form an image of at least a portion of the indicia on the image sensor;

means for alternately energizing the first plurality of darkfield illumination elements and the second plurality of darkfield illumination elements;

first memory means, cooperative with the image sensor, for storing a first darkfield image resulting from energizing the first plurality of illumination elements;

second memory means, cooperative with the image sensor, for storing a second darkfield image resulting from energizing the second plurality of illumination elements; and image combination means, cooperative with the first and second memory means, for combining the first darkfield image and the second darkfield image so as to provide an extended darkfield image.

* * * * *